United States Patent
Torti, Jr.

[11] 3,905,723
[45] Sept. 16, 1975

[54] COMPOSITE CERAMIC TURBINE ROTOR
[75] Inventor: Maurice L. Torti, Jr., Boston, Mass.
[73] Assignee: Norton Company, Worcester, Mass.
[22] Filed: Oct. 27, 1972
[21] Appl. No.: 301,472

[52] U.S. Cl. ................. 416/241; 416/213; 416/244
[51] Int. Cl. ............................................. F01d 5/28
[58] Field of Search ................... 416/244, 213, 241; 60/200 A

[56] References Cited
UNITED STATES PATENTS

| | | | |
|---|---|---|---|
| 2,297,508 | 9/1942 | Schutte | 416/241 |
| 2,769,611 | 11/1956 | Schwarzkopf | 416/219 |
| 2,810,513 | 10/1957 | McVeigh | 415/214 UX |
| 3,091,548 | 5/1963 | Dillon | 416/241 |
| 3,312,449 | 4/1967 | Chandley | 416/241 |
| 3,424,434 | 1/1969 | Palfreyman et al. | 415/214 UX |

FOREIGN PATENTS OR APPLICATIONS

| | | | |
|---|---|---|---|
| 139,210 | 9/1947 | Australia | 416/241 |
| 903,268 | 1/1945 | France | 416/241 |
| 1,426,849 | 4/1969 | Germany | 416/213 |
| 802,666 | 10/1958 | United Kingdom | 416/213 |
| 806,810 | 12/1958 | United Kingdom | 416/213 |
| 220,294 | 6/1942 | Switzerland | 416/241 |
| 694,170 | 7/1953 | United Kingdom | 416/241 B |

OTHER PUBLICATIONS
A. P. C. Application Ser. No. 385,333, Published May 25, 1943, of A. Schutte.
A. P. C. Application Ser. No. 385,334, Published May 25, 1943, of Schutte.

*Primary Examiner*—Everette A. Powell, Jr.
*Attorney, Agent, or Firm*—Arthur A. Loiselle, Jr.

[57] ABSTRACT

A turbine rotor, comprising a hub or center section and an outer blade section integrally attached to the hub section, both sections being composed of a ceramic refractory material. The hub section possesses a high degree of mechanical strength, which normally requires that it have a specific gravity close to the theoretical specific gravity of the ceramic material used. The blade section of the rotor, which is permanently bonded to the hub, is composed of the same ceramic material as the hub section but of lower strength and lower density. The effect of the latter is relative ease of fabrication and reduced stresses on the hub section when attached thereto.

8 Claims, 4 Drawing Figures

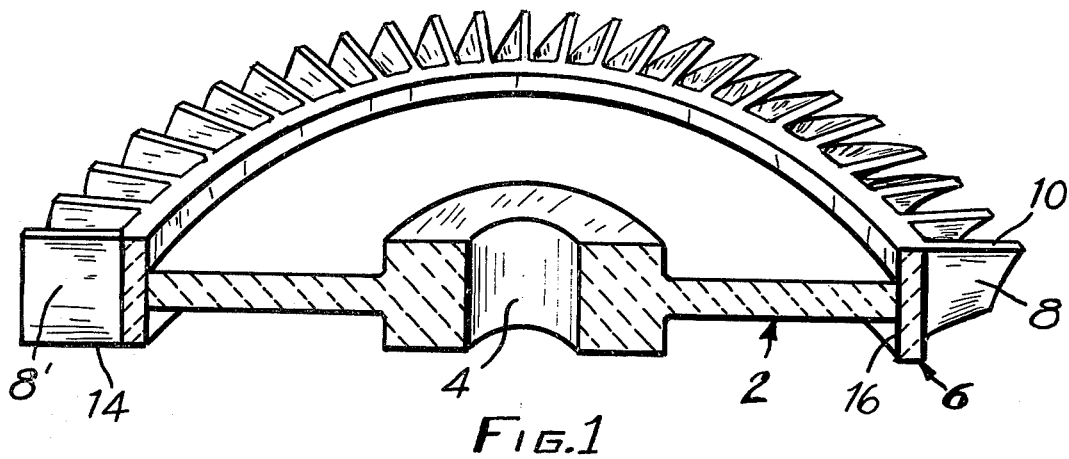
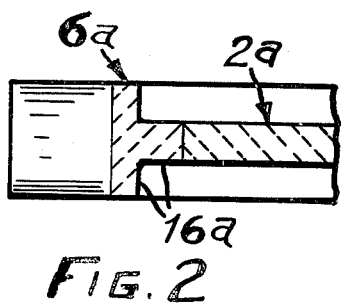
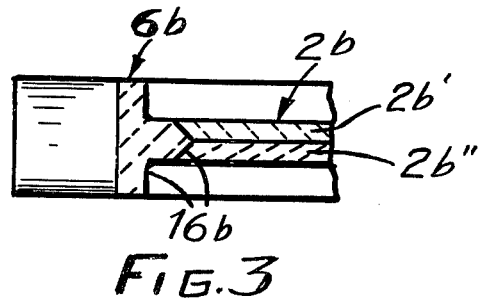
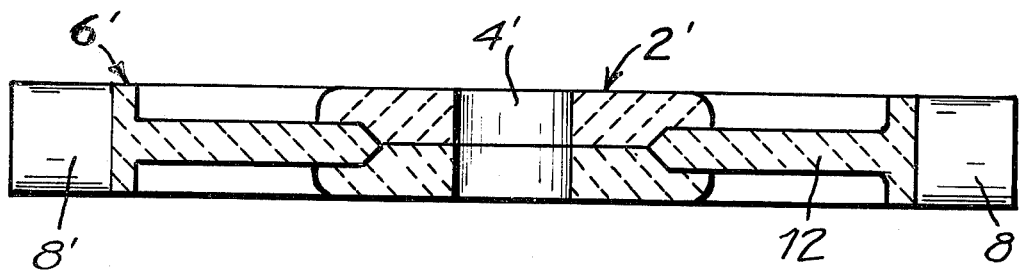

COMPOSITE CERAMIC TURBINE ROTOR

BACKGROUND OF THE INVENTION

The invention relates to the field of turbine engines and the like and more particularly to the moving parts thereof, specifically the turbine rotors.

The pace setter in the evolution of the gas turbine engine has been the development of metals that would successfully withstand the high temperatures and corrosive environment created by, and which permeate the turbine engine. Historically, new metals were developed which were able to withstand increasingly severe internal turbine operating conditions, until todays generation of nickel-cobalt super alloys which can be practically utilized in temperature environments of the order of 1000°C. The major components in a turbine engine which are subjected to these extreme conditions are the combustor, inlet nose cone, stators, and rotors.

The major obstacle to further technical advancements in turbine engines, and to their widespread use in such applications as large electrical generator and vehicular engines, is the relative inefficiency of the turbine engine because of the restriction in operating temperature imposed by the lack of availability of materials that will operate for practical periods of time at temperatures greater than 1000°C. For this reason turbine engineers are now looking to ceramics. Although ceramic materials are difficult to fabricate and are generally considered brittle materials, their use in vital engine parts promises the possibility of engine operating temperatures of 1370°C and higher. At approximately 1370°C, the fuel consumption in a given engine should be 20% less than at an operating temperature of 1000°C. A further enticement is the low cost of ceramics as opposed to the super alloys now available; typically the latter costs $6 and $10 per pound while the former bears a price tag of only about 25 cents per pound. In addition ceramic materials are about 60% lighter in weight than the metal alloys. The two most promising ceramic materials, at this point in time, appear to be silicon nitride and silicon carbide.

Ceramic shapes, depending on the degree of complexity thereof, are manufactured generally by (1) preforming the ceramic material, usually with the aid of a temporary organic binder, and firing the shape to sinter the particles of the ceramic material; (2) preforming the shape using a powdered metal, e.g. silicon, and reaction bonding the shape by facilitating the in situ reaction between the metal and for example nitrogen or carbon; (3) hot-pressing the ceramic material directly to the desired shape; or, (4) chemical vapor deposition. Methods (1) and (2) are particularly attractive when the ceramic part is complex in configuration, however, these methods generally produce parts containing 20% or more porosity which has a very substantial detrimental effect on the mechanical strength of the part. On the other hand the hot-pressing approach results in very low porosity parts and hence high strength parts, but the degree of complexity of the ceramic parts that can be fabricated by hot-pressing is very limited.

Although sintering and reaction bonding produce porous parts, the parts possess enough inherent strength that these methods may be used to fabricate the stationary parts in a turbine engine such as the combustor, inlet nose cone, and the stators. However, the rotors present another problem. Because of the extremely high rotational speeds at which the rotors must function, particularly in the smaller turbine engines, reaction bonded or sintered ceramic rotors would be seriously restricted in the speed at which they may be safely operated because of the relatively low strength level of parts made by either of these methods. The obvious solution is to hot--press the rotors. However, the geometric complexity of the pitched multi blade requirements of the rotors makes it practically unrealistic to directly hot-press the complete rotor.

SUMMARY OF THE INVENTION

Since hot-pressed ceramic rotors are impractical to fabricate because of their complexity, and since sintered or reaction bonded ceramic parts do not have sufficient strength, this invention is a combination of a hot-pressed hub which is dense, strong, and simple in shape which is integrally attached to an outer blade section which is less dense, not as strong, and complex in shape. A further advantage of this combination is that the lower density of the outer blade section reduces the stresses in the hub.

Specifically, a composite integral ceramic turbine engine rotor made up of a blade section which has a modulus of rupture of from $15 \times 10^3$ p.s.i. to $60 \times 10^3$ p.s.i. and which is permanently affixed to a center or hub section which in turn has a modulus of rupture of from $80 \times 10^3$ p.s.i. to $15 \times 10^4$ p.s.i. This provides a rotor with a high strength center or hub section where the forces in a rotating disc are the greatest. Although the invention is inclusive of ceramic materials generally, silicon carbide, silicon nitride, and alloys or mixtures of the two are the materials of primary interest.

BRIEF DESCRIPTION OF THE DRAWING

FIG. 1 is a perspective vertical section through a ceramic turbine rotor.

FIG. 2 is a partial cross-sectional view of a ring shaped rotor blade section.

FIG. 3 is a partial cross-sectional view of an edge configuration for a two-part turbine rotor hub section.

FIG. 4 is a cross-sectional view through a rotor having a relatively thick, two-part hub section.

DESCRIPTION OF THE PREFERRED EMBODIMENTS

FIG. 1 shows a common rotor configuration. Referring to FIG. 1, the finished rotor, though unitary, may be considered to have a ceramic hub or center section 2, having a specific gravity of from 90 to 100% of the theoretical specific gravity of the particular ceramic material used, including a flanged hole 4 for mounting the rotor on a drive shaft; and a ceramic blade section or outer ring 6, having a specific gravity of from 60 to 90% of the theoretical specific gravity of the ceramic material used, which completely surrounds the hub section 2. The ring section may typically be made up of 24 blades which are pitched. In FIG. 1 the blade 8 is shown with its upper edge 10 pitched toward the viewer while blade 8' has its lower edge 14 pitched toward the viewer.

In the preferred practice of the invention the integral or unitary ceramic rotors are made of silicon carbide or silicon nitride. In addition to being inexpensive these two materials have excellent physical properties at room temperature and at temperatures of the order of 1370°C. At this temperature dense hot-pressed silicon nitride has a cross bending strength of 55,000 p.s.i. and higher. Hot-pressed silicon carbide has exhibited cross bending strengths at 1370°C of the order of 80,000 p.s.i. and indications are that dense silicon carbide will still possess adequate strength at 1,500°C.

In one embodiment of the invention a silicon nitride or silicon carbide blade section (a unitary ring of blades) is formed e.g. by slip casting. The green blade section is then sintered. The blade section is placed in a graphite mold of appropriate configuration; silicon carbide or silicon nitride molding powder, which may contain refractory fibers of carbon, silicon carbide, silicon nitride, boron nitride or the like, is placed within the confines of the mold and blade section, and subsequently hot-pressed, preferably to the theoretical specific gravity of the silicon carbide or silicon nitride used. The result is a very dense, high strength hub section permanently bonded to a less dense and relatively lower strength blade section to form an integral ceramic turbine rotor. When this approach is used the inner wall 16 of the blade section, 6 in FIG. 1, may be simply straight or it may have any degree of complexity such as for example, that shown as 16a in FIG. 2. Other configurations are also possible, the advantage of which would be to present a greater surface area for bonding between the preformed and sintered blade section, and the ceramic powder being hot-pressed thereto.

In another embodiment, the above may be modified by preparing a green blade section of powdered silicon metal and e.g. nitriding the silicon preform to produce a reaction bonded silicon nitride blade section, as described in U.S. Pat. No. 3,222,438. This blade section may then be provided with a high strength, hot-pressed silicon nitride hub section as described above.

In still a further embodiment, the silicon carbide or silicon nitride blade section is prepared by either of the methods described above i.e. sintering or reaction bonding. The hub section is formed separately by hot-pressing. The two sections are then bonded together by heating the blade section, causing it to expand, placing the enlarged ring over the hub section, then heating this combination to a temperature sufficient to cause diffusion bonding or sintering at their interface. The dimensions of the two sections must match within rather close limits. When this approach is used, the configuration of the inside surface 16 of the blade section 6 must be rather simple e.g. 16a in FIG 2, to allow the hot blade section to be slipped over the hub section. Alternatively, the two prefabricated sections may be joined by a refractory cement e.g. silicon nitride containing a MgO flux, magnesium silicate, silicon aluminum oxynitride or the like.

In still a further embodiment, the blade section is fabricated by casting and sintering, or by reaction bonding as above. The hub section, before being united with the blade section, is in two parts which are essentially two mating prefabricated hot-pressed discs as shown, for example, in FIG. 3. Preferably the edges of the two mating discs are contoured in such a manner as to form some sort of a wedge match with a correspondingly shaped inner portion of the blade section to be used. FIG. 3 shows two mating hot-pressed discs, 2b' and 2b", the edges of which are straight beveled. When these two discs are joined, they form a V-shaped concavity. The two discs may be joined to each other and to a prefabricated blade section having a mating V-shaped protrusion on the inner surface 16b, such as that shown in FIG. 3, by placing the three parts in an appropriately shaped mold and hot-pressing, which results in bonding or sintering between the two discs and between the edges of the disc and the wedge shaped inner rim of the blade section. Other configurations of the protrusion on the inner surface 16b are possible. It may be dovetail in shape, convex, or even stepped. Such configurations, of course, require a mating configuration in the outer periphery of the two discs 2b' and 2b", which cooperate to form the hub section 2b.

Rather than joining the three parts by hot-pressing, they may be formed into a unitary rotor with the use of a refractory cement such as those already mentioned. More specifically, referring to FIG. 3, a blade section 6b is formed by reaction bonding. A two-part hub section 2b is fabricated by separately hot-pressing two silicon nitride discs with beveled edges shown as 2b' and 2b" in FIG. 3. A refractory cement is prepared by mixing 50 parts by weight of alpha-silicon nitride and 50 parts by weight of colloidal alumina with sufficient methyl alcohol to form a paste. The mixture is then painted on the mating surfaces of the two parts 2b' and 2b" of the hub section 2b and on the two mating surfaces of 16b of the ring section 6b. The three parts 6b, 2b' and 2b" are assembled in a hot-pressing mold which is continuously purged with argon, while a pressure of 1,000 p.s.i. is applied to the parts 2b' and 2b" and the entire assembly is heated over a period of about 3 hours to a temperature of 1,730°C; the temperature is held at 1,730°C for 15 minutes. All three parts are then permanently bonded to each other by a silicon aluminum oxynitride cement which forms during and as a result of the foregoing heat treatment.

The corrosion and/or erosion resistance of particularly the blade section of a rotor of any of the foregoing embodiments, may be substantially improved by applying an impervious refractory coating thereon. One very convenient method is by chemical vapor deposition, as described in U.S. Pat. No. 3,157,541. For example, the rotor may be heated to about 1,250°C and exposed to a gas composed of methyltrichlorosilane and argon. The methyltrichlorosilane decomposes upon contact with the hot rotor, forming silicon carbide thereon.

FIG. 4 is a further design modification of the present invention. Here the hub section 2' is of the twopart type but is smaller in diameter and greater in thickness than in the afore discussed rotor configurations. As a result, the blade section 6' has an elongated section 12 which is fitted and cemented between the two parts of the hub 6'.

It is to be understood that the various individual processes per se, which have been discussed above, do not constitute part of the present invention. The sintering, reaction bonding, and hot-press processes are well known in the art along with numerous variations and permutations, thereof, all of which are amenable to the manufacture of the integral composite turbine rotor of the present invention.

What is claimed is:
1. A composite ceramic turbine rotor comprising:
   a hub section, and a blade section permanently joined thereto, wherein the specific gravity of said hub section is 90 to 100%, and the specific gravity of said blade section is 60 to 90%, of the theoretical specific gravity of the ceramic material of which they are composed, said ceramic material of said hub section and said blade section is one selected from the group consisting of silicon nitride, silicon carbide, and mixtures thereof, and wherein said blade section is coated with an impervious coating of a refractory material.

2. The composite ceramic turbine rotor of claim 1 wherein said refractory material of said impervious layer is one selected from the group consisting of silicon carbide, and silicon nitride.

3. The turbine rotor of claim 1 wherein said hub section is made up of two parts permanently joined together and permanently joined to said blade section.

4. The turbine rotor of claim 1 wherein said hub section is joined to said blade section by diffusion bonding.

5. The turbine rotor of claim 3 wherein said hub section is joined to said blade section with a refractory cement.

6. A composite ceramic turbine rotor comprising:
a hub section, and a blade section permanently joined thereto, wherein the specific gravity of said hub section is 90 to 100% and the specific gravity of said blade section is 60 to 90%, of the theoretical specific gravity of the ceramic material of which they are composed, said ceramic material of said hub section and said blade section is one selected from the group consisting of silicon nitride, silicon carbide, and mixtures thereof, and wherein said hub section is made up of two parts, said parts being permanently jointed together with a refractory cement.

7. A composite ceramic turbine rotor comprising:
a hub section, and a blade section permanently joined thereto, wherein the specific gravity of said hub section is 90 to 100% and the specific gravity of said blade section is 60 to 90%, of the theoretical specific gravity of the ceramic material of which they are composed, said ceramic material of said hub section and said blade section is one selected from the group consisting of silicon nitride, silicon carbide, and mixtures thereof, and wherein said ceramic material is reinforced with refractory fibers, said refractory fibers being composed of a material selected from the group consisting of carbon, silicon carbide, silicon nitride, and boron nitride.

8. A composite ceramic turbine rotor comprising:
a hub section, and a blade section permanently joined thereto, wherein the specific gravity of said hub section is 90 to 100%, and the specific gravity of said blade section is 60 to 90%, of the theoretical specific gravity of the ceramic material of which they are composed, said ceramic material of said hub section and said blade section is one selected from the group consisting of silicon nitride, silicon carbide, and mixtures thereof, and wherein said blade section is coated with a corrosion and/or erosion resistant coating of a refractory material.

* * * * *